J. G. SHODRON.
HARNESS SUPPORT.
APPLICATION FILED AUG. 30, 1916.
1,297,021.
Patented Mar. 11, 1919.
2 SHEETS—SHEET 1.
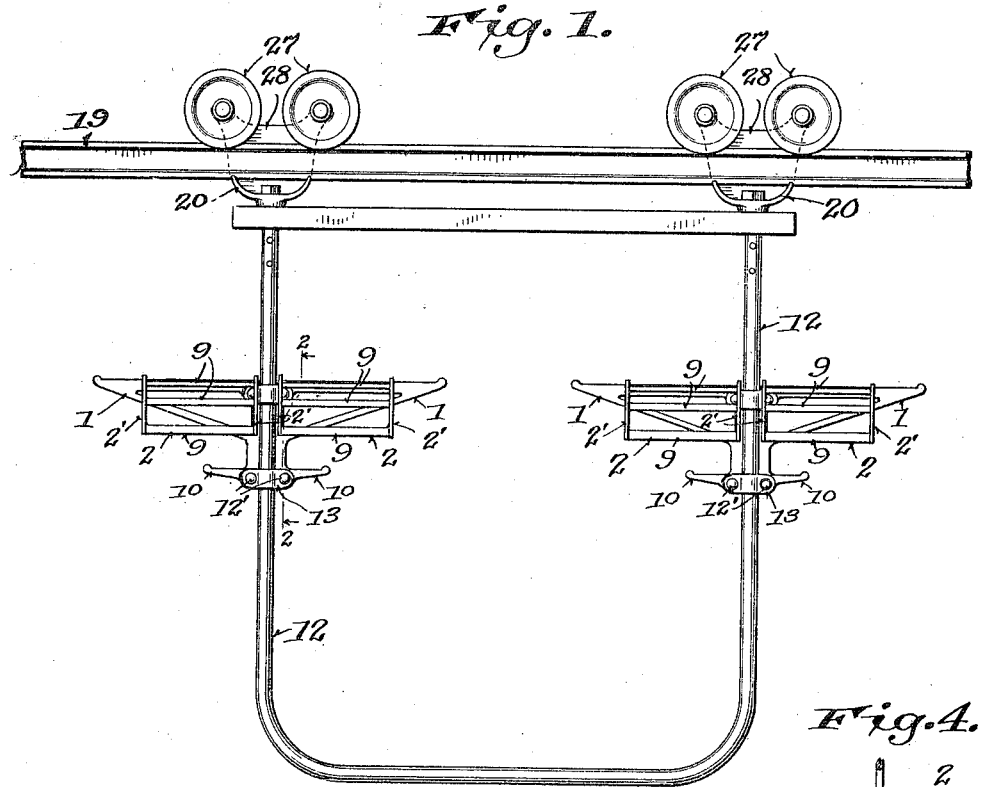
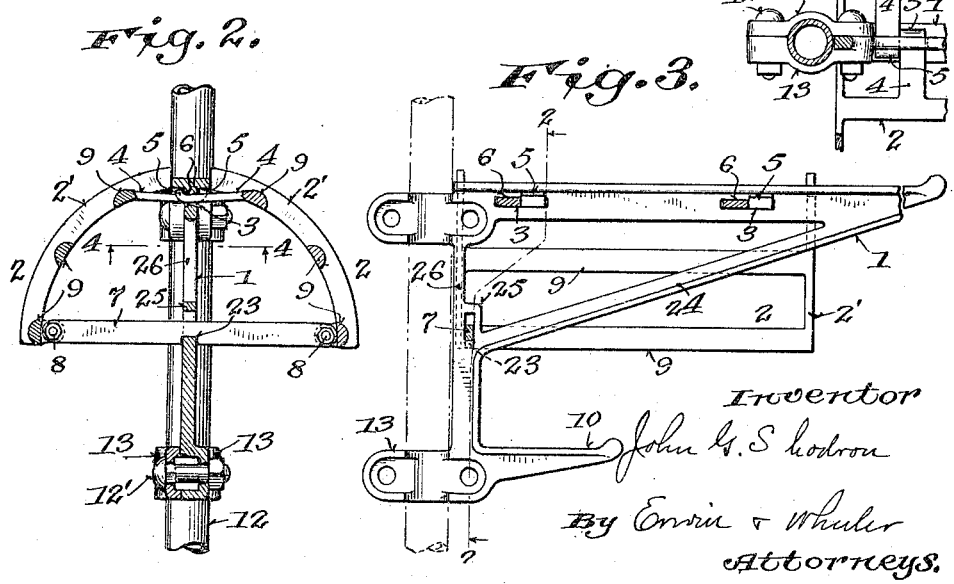

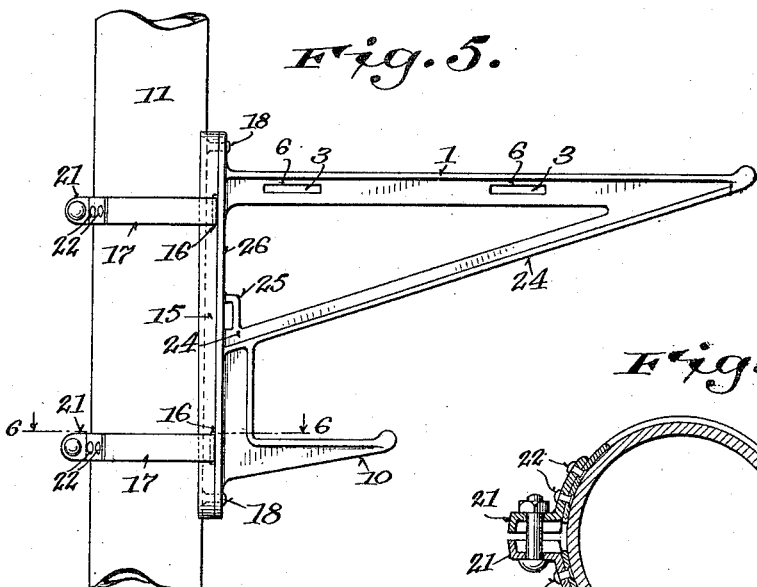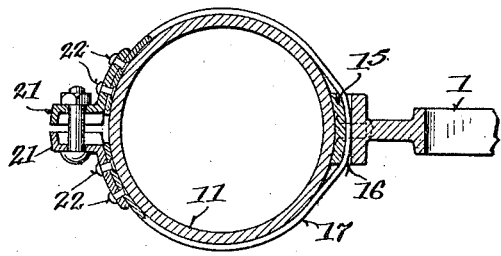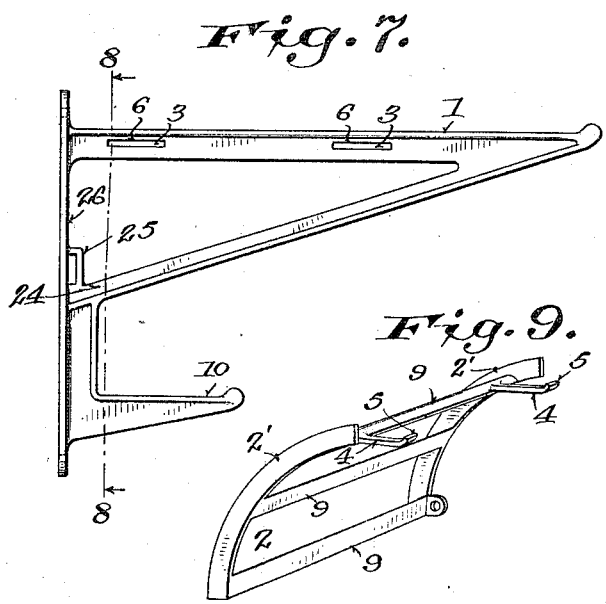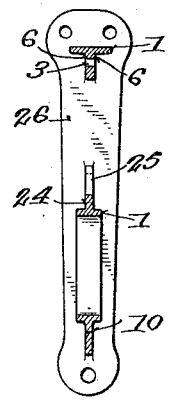

UNITED STATES PATENT OFFICE.

JOHN G. SHODRON, OF FORT ATKINSON, WISCONSIN, ASSIGNOR TO JAMES MANUFACTURING COMPANY, OF FORT ATKINSON, WISCONSIN, A CORPORATION OF WISCONSIN.

HARNESS-SUPPORT.

1,297,021.  Specification of Letters Patent.  Patented Mar. 11, 1919.

Application filed August 30, 1916. Serial No. 117,611.

*To all whom it may concern:*

Be it known that I, JOHN G. SHODRON, a citizen of the United States, residing at the city of Fort Atkinson, county of Jefferson, and State of Wisconsin, have invented new and useful Improvements in Harness-Supports, of which the following is a specification.

My invention relates to improvements in harness supports.

The object of my invention is to provide a harness hook or support which will afford a broad and rounded bearing for the members of the harness, whereby abrupt bends are avoided, such as might crack and injure the leather; also to provide a set of supporting members which can be readily taken apart and cleaned; also to provide means whereby the harnesses may be conveyed by an overhead carrier from a storage closet to the stables and returned to the closets when the horses are unharnessed.

In the drawings,—

Figure 1 represents my device movably supported from an overhead track.

Fig. 2 is a vertical section thereof, drawn on line 2—2 of Fig. 3.

Fig. 3 is a detail view in vertical section.

Fig. 4 is a detail in horizontal section, drawn on line 4—4 of Fig. 2.

Fig. 5 is a side view showing my device clamped to a stationary standard.

Fig. 6 is a transverse section, drawn on line 6, 6 of Fig. 5.

Fig. 7 is a side view of a portion of my device removed from a support.

Fig. 8 is a vertical section, drawn on line 8—8 of Fig. 7, and

Fig. 9 is a perspective view of one half of the harness supporting saddle removed from the other part of my device.

Like parts are identified by the same reference numerals throughout the several views.

1 is a triangular shaped bracket which is preferably provided with two segmental members 2, which members form a broad support for the harness and prevent the latter from sagging or creasing when supported therefrom. The bracket 1 is provided with a plurality of apertures 3 for the reception of the fingers 4, 4, the outer ends of which fingers curve upwardly slightly, as shown at 5, 5 in Fig. 2, whereby the ends 5, 5 of the fingers 4 when inserted through the slots 3 are caused to engage the downwardly projecting sides 6 of said apertures and thus retain the upper edges of the members 2 in close contact with the respective sides of said triangular bracket 1. When the free ends of the members 5 have been inserted in the apertures 3, as shown in Fig. 2, the outer ends of the members 2 are moved downwardly and connected to the horizontal member 7 by a plurality of bolts 8, 8. As the outer ends of said members 2 are thus secured in place by said bolts the upwardly curved ends 5 of said members 4 are caused to rigidly engage the two opposing sides of said slots 3, whereby the upper ends of said members 2 are securely retained in place. The semi-circular or segmental members 2 are preferably provided with a plurality of transversely arranged members 9 which are formed integrally with the respective end members 2′, and said parts comprising the members 2′, 4 and 9 are hereinafter referred to as a saddle, upon which harnesses are adapted to be supported. Connected with the lower end of the triangular member 1 is a hook 10, and said triangular member and hook are adapted to be rigidly clamped to either a vertical post 11, as shown in Fig. 5, or to a piece of tubing 12, as shown in Fig. 1. 13, 13 are clamping members by which the triangular member 1 and hook 10 are adapted to be secured to the tubular member 12 by bolts 12′. When the bracket 1 and hook 10 are connected with the vertical standard 11, I preferably interpose between said post and said members 1 and 10 a vertical member 15, and said vertical member is provided with a plurality of recesses 16 for the reception of the clamping bands 17, as shown in Fig. 5, said member 15 being connected to said members 1 and 10 by a plurality of bolts 18.

In view of the fact that it is desirable to remove the harnesses from the stalls where horses are kept, my device is preferably supported from a stationary track 19, and said device is connected with the track 19 by one or more hangers, such as the pieces of tubing 12 and a movable carriage 20. The hangers 12 when connected together form a U shaped frame, as shown in Fig. 1, and said hangers 12 may each, if desired, be provided with a plurality of harness supports, each of which supports are secured thereto by the clamping members 13 and a plurality of clamping bolts, as previously described.

When the harness support is secured to a stationary post, as shown in Figs. 5 and 6, the clamping bands 17 are preferably provided at their respective ends with cast metal brackets 21, and said brackets 21 are connected with said members 17 by a plurality of bolts 22. The horizontal member 7 is preferably provided with a recess 23 for the reception of the upper edge of the upwardly inclined member 24, and an angular bracket 25 is preferably formed integral with said member 24 and the vertical member 26. The carriage 20 comprises a plurality of rollers 27, which are revolubly connected with the members 28, and said members 28 are connected with the upper ends of the member 12 in the ordinary manner.

Having thus described my invention what I claim as new and desire to secure by Letters Patent, is:—

1. A harness support, comprising the combination of a bracket, and a set of arcuate sections, having projecting arms adapted to be manipulated into and out of interlocking engagement with said bracket, said sections, when in engagement with the bracket, being adapted to form an arched harness supporting member.

2. A harness support, including the combination of a vertical support, a bracket projecting laterally therefrom and having apertures therein, and a pair of harness supporting members conforming generally to the curve of the back of the animal which the harness is intended to fit, adapted to spread a harness hung thereon, said members having fingers adapted to project through the apertures and hold the members in position.

3. A harness support, including the combination of a vertical support, a bracket projecting laterally therefrom and having apertures therein, a pair of harness supporting members conforming generally to the curve of the back of the animal which the harness is intended to fit, adapted to spread a harness hung thereon, said members having fingers adapted to project through the apertures and hold the members in position, and a spacing bar adapted to hold the lower ends of said members in spaced relation.

4. A harness support comprising the combination with a vertically extending support, a bracket having a plurality of hooks projecting laterally therefrom, one of said hooks having apertures therein, and arcuate spreader members having tongues adapted to project through the apertured hook from opposite sides, and hold the members with their sides extending outwardly and downwardly from the apertured hook, said tongues being curved on their outer ends, whereby they bind the hook between them.

5. A harness support comprising the combination with a vertically extending support, a bracket having a plurality of hooks projecting laterally therefrom, one of said hooks having apertures therein, arcuate spreader members having tongues adapted to project through the apertured hook from opposite sides, and hold the members with their sides extending outwardly and downwardly from the apertured hook, said tongues being curved on their outer ends, whereby they bind the hook between them, and spacing means adapted to hold the lower ends of the spreader members in spaced relation, said spacing means being centrally secured to the bracket.

6. A harness support, comprising the combination with a bracket having a hook and a detachable harness spreader, of a support for the bracket, a spacing block adapted for securement between the bracket and support, and having apertures for the passage of clamping bands therethrough, and clamping bands encircling said support and passing through the apertures in the spacing block.

7. A harness support, comprising the combination of a hanger, a bracket connected therewith, and provided with a slotted arm, a set of arcuate sections, provided with supporting arms adapted to engage in the bracket slots, and to support the sections from the bracket, said sections, when in assembled relation to the bracket, being adapted to form an arched harness supporting member.

8. In a harness support, the combination of a vertical member, one or more horizontal members, said horizontal members being provided with a plurality of apertures, a saddle provided with fingers adapted to extend through the apertures formed in said horizontal member, means for connecting the lower ends of said saddle with each other, and with said horizontal member, substantially as and for the purpose specified.

In testimony whereof I affix my signature in the presence of two witnesses.

JOHN G. SHODRON.

Witnesses:
  JOHN B. OLSON,
  ROBT. J. PARKS.

Copies of this patent may be obtained for five cents each, by addressing the "Commissioner of Patents, Washington, D. C."